United States Patent [19]
Huntimer et al.

[11] Patent Number: 6,010,141
[45] Date of Patent: Jan. 4, 2000

[54] MOLDED BEARING PLATE ASSEMBLY

[75] Inventors: Todd Huntimer, Arlington, S. Dak.; Jeff Marcus Terry, Birmingham, Ala.

[73] Assignee: Global Polymer Industries, Inc., Arlington, S. Dak.

[21] Appl. No.: 08/906,774

[22] Filed: Aug. 6, 1997

[51] Int. Cl.[7] .................................................. B62D 53/08
[52] U.S. Cl. ........................................ 280/433; 384/421
[58] Field of Search ................... 280/433, 423.1; 384/421, 42

[56] References Cited

U.S. PATENT DOCUMENTS

| | | | |
|---|---|---|---|
| 3,174,812 | 3/1965 | Widmer | 384/421 |
| 3,257,969 | 6/1966 | Thomas | 384/421 |
| 3,275,390 | 9/1966 | Franks | 280/433 |
| 3,337,277 | 8/1967 | Arnold | 280/433 |
| 3,704,924 | 12/1972 | Lowry | 280/433 |
| 3,944,296 | 3/1976 | Stampone | 305/38 |
| 4,169,635 | 10/1979 | Szalay et al. | 280/433 |
| 4,542,912 | 9/1985 | St. Louis | 280/433 |
| 4,752,081 | 6/1988 | Reeners et al. | 280/433 |
| 4,946,184 | 8/1990 | Larocco | 280/433 |
| 5,066,035 | 11/1991 | Athans et al. | 280/441.1 |
| 5,165,713 | 11/1992 | Picard | 280/433 |
| 5,165,714 | 11/1992 | Kaim | 384/421 |
| 5,263,856 | 11/1993 | Huehn et al. | 384/421 |
| 5,431,424 | 7/1995 | Colwell | 280/433 |
| 5,482,308 | 1/1996 | Marcu | 280/433 |
| 5,522,613 | 6/1996 | Heeb | 280/433 |
| 5,620,770 | 4/1997 | Cork | 428/121 |
| 5,622,767 | 4/1997 | Cork | 428/121 |
| 5,746,438 | 5/1998 | Bergmann et al. | 280/433 |

*Primary Examiner*—Anne Marie Boehler
*Attorney, Agent, or Firm*—Fredrikson & Byron, P.A.

[57] ABSTRACT

A molded bearing plate of ultra high molecular weight polyethylene is formed with a bearing surface and series of strong, spaced, integrally formed posts extending from the opposed surface. A metal support plate is provided with a series of perforations through which the posts extend. The posts may have exteriorly threaded surfaces, and internally threaded fasteners may be threaded onto the posts to secure the molded bearing plate to the support plate. The posts are integrally formed with the bearing plate in a compression molding operation, and offer sufficient tensile strength to firmly attach the bearing plate to the metal plate. The bearing plate assembly is particularly suitable for use as a fifth wheel assembly.

11 Claims, 1 Drawing Sheet

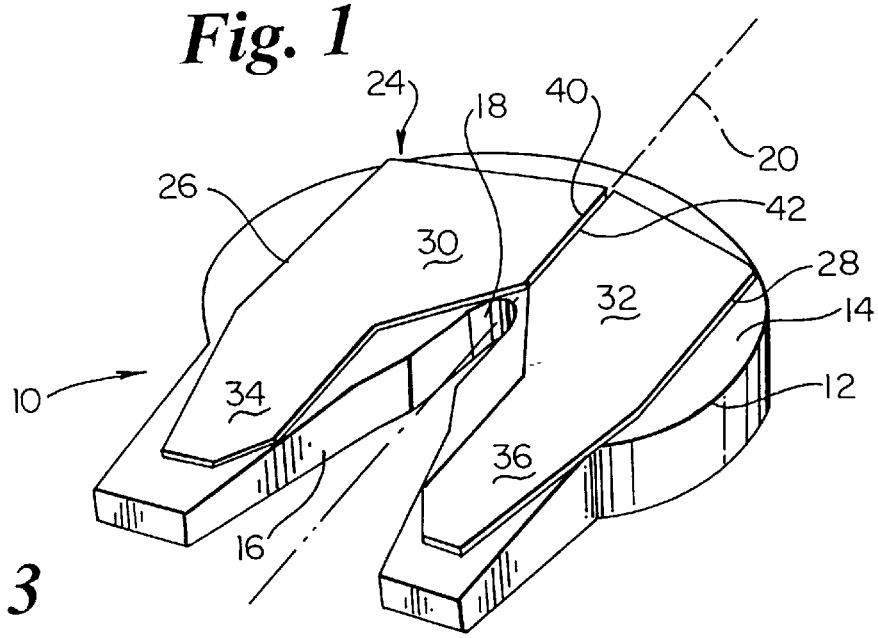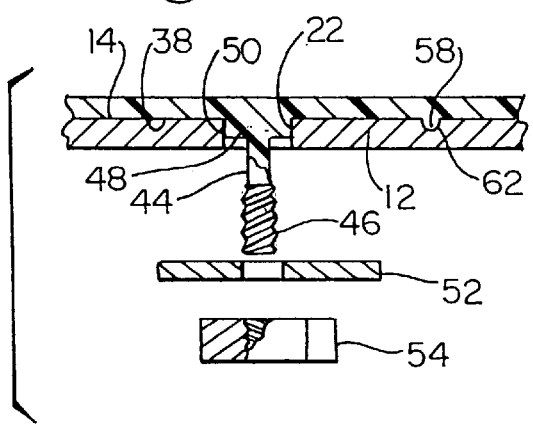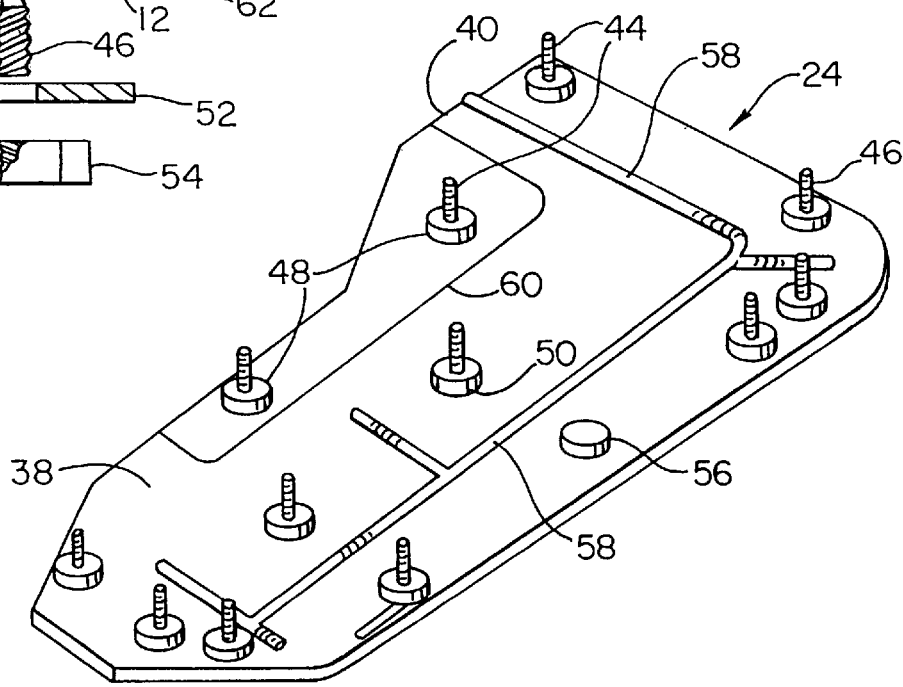

MOLDED BEARING PLATE ASSEMBLY

FIELD OF THE INVENTION

The present invention relates to molded bearing plate assemblies employing ultra high molecular weight polyethylene, and more particularly to low friction molded bearing plates of ultra high molecular weight polyethylene for use in fifth wheel assemblies.

BACKGROUND OF THE INVENTION

Due to the high loads that fifth wheel coupling assemblies between tractors and trailers must bear, and the fact that they are subject to continued sliding action, fifth wheel couplings commonly require repeated lubrication. Metal bearing surfaces of fifth wheel couplings tend to wear badly and eventually must be replaced.

To reduce friction and wear, bearing plates of the type utilized for fifth wheel couplings and for other purposes such as side plates for conveyor belts may be made from extremely durable polymeric materials such as ultra high molecular weight polyethylene (hereafter, "UHMWPE") have been proposed. Reference is made to Colwell, U.S. Pat. No. 5,431,424, Kaim, U.S. Pat. No. 5,165,714 and Cork, U.S. Pat. No. 5,620,770. In use, UHMWPE bearing plates adapted for use in fifth wheel assemblies are subjected to substantial stresses as mating bearing surfaces of fifth wheel assemblies are brought together with substantial force. The primary stresses which bearing plates of this type must withstand are compression and shear forces that are imposed on bearing plates as a tractor and trailer are coupled together and as the tractor is steered into a turn. Similarly, the stationary upright side bearing plates utilized on the sides of a conveyor are subjected to shear and compression forces and can wear badly particularly when abrasive materials are being conveyed.

UHMWPE plates can be fastened to the underlying steel plate of a fifth wheel assembly only with some difficulty. As disclosed in U.S. Pat. No. 5,620,770, couplings of this type can utilize screw fasteners as shown in FIG. 4 of that reference, or can employ adhesives as shown in FIG. 5. When screw fasteners are used, screw holes are first formed through the thickness of the UHMWPE plate and are countersunk so that the head of the screw is beneath the upper surface of the bearing plate. As the bearing plate becomes worn in use, however, the screws eventually become exposed and can damage the fifth wheel coupling. Moreover, machining screw holes through the thickness of an UHMWPE plate tend to further weaken the plate. Adhesives in general have not been successful in strongly bonding UHMWPE to steel plates. Ultra high molecular weight polyethylene is chemically rather inert, and bonds to other materials only with difficulty. The same problems arise when UHMWPE bearing plates are attached to support plates by screws for other uses, such as the side walls of a conveyor.

Ultra high molecular weight polyethylene is a difficult material to form. It is commonly molded in the form of plates or rods, and parts then are machined from these bulk shapes. This is due at least in part to the difficulty that has been experienced in the past in molding UHMWPE into intricate shapes and forms.

It would be desirable to provide a UHMWPE bearing plate which could readily be fastened to a metal support plate without requiring holes to be drilled in it and in a manner that avoids the need for adhesives and also avoids the need for metal screw fasteners.

SUMMARY OF THE INVENTION

I have found that an UHMWPE plates can be molded from UHMWPE resin so as to have integrally formed posts extending away from the plate through perforations in a metal support plate such as a fifth wheel plate, the posts having substantial tensile strength. The downwardly extending posts may be threaded to receive threaded fasteners for the purpose of tightly securing the UHMWPE bearing plate to the support plate such as a fifth wheel metal plate. In a process of the invention, UHMWPE is molded into intricate shapes using a molding technique in which the molding pressure is closely controlled while the mold is at a temperature above 25° F. below the highest molding temperature, and this method enables the molded bearing plate described above to be produced.

Thus, in one embodiment, my invention relates to a molded bearing plate assembly comprising a metal plate having a supporting surface and a plurality of spaced perforations through its thickness, and a molded bearing plate of UHMWPE, the bearing plate having an outer bearing surface and a surface confronting and received against the supporting surface of the metal plate. The confronting surface of the bearing plate has a plurality of spaced posts extending downwardly therefrom and integrally formed during molding of the bearing plate, the posts being externally threaded and extending through respective perforations in the metal plate. A plurality of internally threaded fasteners are threadingly received on respective posts to fasten the bearing plate to the metal plate and to restrain lateral movement of the bearing plate with respect to the metal plate.

In its preferred embodiment, the invention relates to a fifth wheel assembly for a vehicle that comprises a metal fifth wheel support plate having an upper surface and a plurality of spaced perforations through its thickness. The fifth wheel assembly includes a molded UHMWPE bearing plate having an upper bearing surface and a lower surface received against the upper surface of the metal plate. Here, the lower surface of the molded UHMWPE bearing plate includes a plurality of downwardly extending spaced posts and cylindrical bosses integrally formed during molding of the bearing plate. The posts are externally threaded, and extend through respective perforations in the metal support plate with the bosses closely received in the perforations. A plurality of internally threaded fasteners are threadingly received on respective posts to fasten the bearing plate to the metal plate and to restrain lateral movement of the bearing plate with respect to the metal fifth wheel plate.

In another embodiment, my invention relates to a method for forming a bearing plate of UHMNWPE that has an outer bearing surface and that can be tightly attached to a supporting metal plate such as the metal plate of a fifth wheel assembly. The method comprises providing a mold configured to produce the bearing plate, the mold having a smooth surface defining the outer surface of the bearing plate and an opposed surface. The opposed surface of the mold includes a plurality of spaced depressions configured to define a plurality of spaced posts extending from but integrally formed with that surface of the bearing plate. In this method, UHMWPE particles are introduced into the open mold between the mold surfaces and into said depressions, the UHMWPE being molded under temperature and pressure conditions yielding a strong bearing plate having integrally formed, outwardly extending posts. Preferably, the molding pressure is not allowed to deviate significantly from a predetermined value while the mold is at a temperature within 25° F. of its highest temperature during the molding cycle.

BRIEF DESCRIPTION OF THE DRAWING

FIG. 1 is a largely schematic, perspective view of a fifth wheel of the invention;

FIG. 2 is a perspective view of the bottom surface of a bearing plate of the invention; and FIG. 3 is a broken-away, cross-sectional view of the threaded connection between a bearing plate of the invention and the metal support plate of a fifth wheel assembly.

DETAILED DESCRIPTION OF THE PREFERRED EMBODIMENT

FIG. 1 illustrates a tractor fifth wheel assembly 10 comprising a metal plate 12 having an upper surface 14. The plate 12 is of a shape common to fifth wheel couplings; that is, it has a generally circular configuration with a bifurcated rear portion 16 defining a king pin-receiving slot 18 that extends to the center of the plate. The walls of the slot 18 converge forwardly so as to guide a king pin of a trailer coupling toward the center of the plate, all in a known fashion. The slot 18 defines a forwardly and rearwardly extending axis 20. The metal plate 12 includes a plurality of spaced perforations through its thickness, a typical perforation being shown at 22 in FIG. 3.

The ultra high molecular weight polyethylene molded bearing plate of the invention is designated generally as 24 and desirably is formed as half plate sections 26, 28. Roughly semicircular in configuration, the plate sections together have an upwardly facing bearing area that cover preferably the majority of the area of the plate 12 on either side of the axis 20. The plate half sections have generally broader central areas 30, 32, on each side of the slot 18, and also have narrower sections 34, 36 that diverge rearwardly on each side of the slot to accommodate passage of a king pin through the slot. Note that the bearing plate halves 26, 28 have forwardly extending facing edges 40, 42 that closely confront each other; that is, they abut or are closely adjacent to each other.

The UHMWPE bearing plate of the invention desirably is molded in half sections, as shown in FIGS. 1 and 2, largely for ease of molding. The plate can be made as a single unit, of course, and the periphery of the plate may be gently rounded to more closely conform to the generally circular configuration of the metal plate 12. As illustrated in the drawing, the plate half sections are substantially mirror images of each other; that is, the bearing plate is substantially symmetrical about the axis 20.

FIG. 2 is a perspective view of bearing plate half section 30 of FIG. 1, turned upside down. Extending downwardly from the lower surface of the bearing plate 24 are a plurality of spaced posts 44 that are molded integrally—that is, as a part of and concurrently with—the rest of the UHMWPE bearing plate 24. As shown in FIGS. 2 and 3, the posts have distal threaded sections 46 and desirably also have integrally formed bosses 48. In the depicted preferred embodiment, the bosses are generally cylindrical and have surfaces 50 that are configured to be closely received within the perforations 22 formed in the metal plate 12, the abutting surfaces 22, 50 of the perforations and the bosses serving to support the molded bearing plate 24 from sliding on the upper surface 14 of the metal plate.

As shown in FIG. 3, the threaded post 46, after passing through the perforation 22 in the metal plate, is received within a washer 52 that is held firmly against the under surface of the metal plate 12 by means of a threaded nut 54. In those locations in which the configuration of the metal fifth wheel plate does not permit one to have ready access to its under surface to attach threaded fasteners 54, the bosses may be provided without threaded posts, as shown at 56 in FIG. 2.

The bottom surface 38 of the UHMWPE bearing plate may be provided with outwardly extending integral projections formed by molding with the plate, the projections being exemplified as raised ribs 58 in FIGS. 2 and 3. The projections are shaped and positioned to be received in recesses exemplified as existing lubricating channels 62 of the fifth wheel support plate. The contact between the ribs 58 and the lubricating channels 62 serves to further restrain the bearing plate from moving laterally with respect to the fifth wheel support plate and thus contribute to the resistance of the attachment of the bearing plate to the support plate against failure in shear. That is, as the bearing plate is held tightly to the fifth wheel support plate by the posts and threaded fasteners, the ribs 58 are retained securely in and against the sides of the lubricating channels 62 to contribute to shear strength. The ribs also aid in assuring proper positioning of the molded bearing plate on the fifth wheel support plate. Also, the bottom surface 38 of the molded plate may have slightly raised portions as shown at 60 in FIG. 2, as needed. Desirably, the bearing plate is configured to lie flatly against the upper surface of the metal fifth wheel plate so as to present a flat upper surface for articulation with the mating plate of a trailer coupling.

By ultra high molecular weight polyethylene, reference is made to high density polyethylene polymers having molecular weights exceeding about $3\times10^6$. UHMWPE polymers are said to provide abrasion resistance greater than that of any other thermoplastic and the highest impact toughness of any plastic, together with good corrosion resistance and excellent environmental stress-crack resistance. The UHMWPE polymers useful in the present invention can include fillers and modifiers as desired, such as graphite fibers, powdered metals and the like. Ultra high molecular weight polyethylene resins generally cannot be readily processed by thermoplastic melt processing techniques such as injection molding, thermoforming or the like. A discussion of ultra high molecular weight polyethylene appears in the *Concise Encyclopedia of Polymer Science and Engineering*, John Wiley & Sons, New York, 1990, page 357, which page in incorporated by reference herein.

Although thermoforming of UHMWPE resins is difficult, as noted above, I have found that such resins can be thermally processed into fairly intricate shapes through the use of a compression molding technique in which UHMWPE particles are introduced into an open mold and distributed so as to fill the mold cavity, thereby requiring little in the way of plastic flow during the molding cycle. It has been found to be important to carefully regulate molding pressure at a temperatures above about 25° F. below the highest molding temperature in the molding cycle. That is, in this temperature range, the pressure should not be allowed to significantly fall below a predetermined value nor significantly exceed that value. Pressures in the range of 1,500 psi have been found to work well. Molding temperatures in the range of about 375° F. have given good results, with the pressure being regulated carefully at temperatures within about 25° F. of the highest molding temperature.

An ultra high molecular weight fifth wheel bearing plate of the invention can be manufactured utilizing a compression mold having generally parallel surfaces defining the plate. One of the mold surfaces is smooth and defines the upper surface of the fifth wheel bearing plate as it is oriented for use, and the other surface of the mold has a plurality of spaced depressions that are configured to define a plurality of posts extending from but integrally formed with the bottom surface of the bearing plate. UHMWPE particles, commonly in flake form, are introduced into the open mold between the mold surfaces and into the depressions to avoid the necessity of substantial flow during the compression molding cycle. The mold is closed, and pressures in the range of about 1200 to about 2000 psi, preferably in the range of about 1,500 psi, are applied to the mold contents as the temperature is raised. Molding temperatures in the range of about 300° F. to about 400° F. and preferably about 375° F. are reached, the pressure being controlled carefully while the mold is at a temperature within about 25° F. of its highest molding temperature. As the temperature of the mold is increased and fusion of the UHMWPE particles occurs, followed by cooling of the mold, volumetric changes in the resin require the mold parts to be adjusted with respect to one another in order to maintain the desired pressure, and this can be accomplished through the use of commercially available hydraulic servomechanisms.

Ultra high molecular weight polyethylene, as noted above, has been valued for its resistance to abrasion and its toughness. That is, this material is commonly used in situations in which it is subjected to compressive forces but not subjected to substantial tensile stress. For example, ultra high molecular weight polyethylene plates in the prior art commonly have been attached by bolts onto a fifth wheel metal plate. Surprisingly, when the posts 44 are formed integrally with the plate in the instant invention, the posts exhibit substantial tensile strength when they are placed under tension through the use of threaded fasteners beneath the metal plates to which they are attached, as shown in FIG. 3. The tensile strength of the posts are sufficiently high as to enable the ultra high molecular weight polyethylene bearing plate to be drawn downwardly against the metal fifth wheel plate and securely fastened to the metal plate.

As noted above, the ultra high molecular weight polyethylene bearing plate of the invention can be produced either as a single part or in sections, as illustrated by the plate half sections shown in FIG. 1. Molding of the plate as plate halves is desired in order to conveniently reduce the surface area under pressure during molding.

Once the ultra high molecular weight bearing plate or plate portions have been removed from the mold, threads may be cut in the end portions of the posts 44 using conventional thread cutting techniques.

As shown in FIG. 2, the posts 44 are spaced from one another across the bottom surface 38 of the bearing plate with, preferably, the posts being oriented near the edges of the plate. A bearing plate half section such as is shown in FIG. 2 may have posts ranging in number from about to about 10 to about 20, with 12 such posts being shown in the drawing. Bearing plates may range greatly in thickness but preferably range from about one-eighth inch to about one-half inch, with a typical plate being approximately 5/16 inches in thickness. The posts may be of any convenient length, but preferably are in the range of about one to about three inches with 1 5/16 inches being typical. The posts may be in the range of about one-half inch in diameter, with the bosses being in the range of about 1 1/8 inches in diameter, although these dimensions may be varied as desired. The height of the bosses desirably is approximately equal to the height of the metal plate through which the posts extend, and typically will be in the range of about 5/16 inches.

Although the invention has been described and explained primarily in connection with fifth wheel assemblies, it will be understood that the above description applies as well to bearing plates for other uses.

While a preferred embodiment of the present invention has been described, it should be understood that various changes, adaptations and modifications may be made therein without departing from the spirit of the invention and the scope of the appended claims.

I claim:

1. A molded bearing plate assembly comprising a metal plate having a supporting surface and a plurality of spaced perforations therethrough, and a molded bearing plate of ultra high molecular weight polyethylene, the molded bearing plate having an outer bearing surface and an opposed surface confronting and received against the supporting surface of the metal plate, said opposed surface of the molded bearing plate having a plurality of spaced posts extending therefrom and integrally formed by molding with the bearing plate, the posts being externally threaded and extending through respective perforations in the metal plate, and a plurality of internally threaded fasteners threadingly received on respective posts to fasten the bearing plate to the metal plate and to restrain lateral movement of the bearing plate with respect to the metal plate.

2. The molded bearing plate assembly of claim 1 wherein said posts are spaced approximately uniformly across said opposed surface of the bearing plate.

3. The molded bearing plate assembly of claim 1 wherein said supporting surface of the metal plate includes a recess and wherein the bearing plate includes on its opposed surface a projection integrally formed by molding with the bearing plate and shaped and positioned to be received in and retained securely in said recess.

4. The molded bearing plate assembly of claim 3 wherein said projection comprises a generally cylindrical boss closely received in said recess, said boss and recess having abutting surfaces serving to support the molded bearing plate from sliding on the supporting surface of the metal plate.

5. A molded bearing plate assembly for use as a fifth wheel for a vehicle comprising a metal plate having an upper surface and a plurality of spaced perforations therethrough, and a molded bearing plate of ultra high molecular weight polyethylene, the bearing plate having an upper bearing surface and a lower surface received against the upper surface of the metal plate, the lower surface of the bearing plate having a plurality of spaced posts extending downwardly therefrom and integrally formed by molding with the bearing plate, the posts being externally threaded and extending through respective perforations in the metal plate, and a plurality of internally threaded fasteners threadingly received on respective posts to fasten the bearing plate to the metal plate and to restrain lateral movement of the bearing plate with respect to the metal fifth wheel plate.

6. The molded bearing assembly of claim 5 wherein said posts are spaced approximately uniformly across the lower surface of the bearing plate.

7. The molded bearing assembly of claim 5 wherein said metal plate includes a bifurcated rear portion defining a kingpin-receiving slot, and wherein said bearing plate comprises a pair of plate half sections respectively receivable on the sides of a forwardly-extending axis defined by the kingpin-receiving slot, the bearing plate half sections having closely confronting edges forwardly of the slot and diverging rearwardly to accommodate a king pin received in said slot.

8. The molded bearing assembly of claim 5 wherein said bearing plate half sections are substantial mirror images of each other.

9. The molded bearing plate assembly of claim 5 wherein said supporting surface of the metal plate includes a recess and wherein the bearing plate includes on its opposed surface a projection integrally formed by molding with the bearing plate and shaped and positioned to be received in and retained securely in said recess.

10. The molded bearing assembly of claim 8 wherein said recess comprises the lubrication channels formed in the upper surface of the metal plate and said projection comprises ribs on the opposed surface shaped and positioned to be received within said channels.

11. The molded bearing plate assembly of claim 9 wherein said projection comprises a generally cylindrical boss closely received in said recess, said boss and recess having abutting surfaces serving to support the molded bearing plate from sliding on the supporting surface of the metal plate.

* * * * *